United States Patent
Sumida et al.

(10) Patent No.: US 10,055,244 B2
(45) Date of Patent: Aug. 21, 2018

(54) BOOT CONTROL PROGRAM, BOOT CONTROL METHOD, AND BOOT CONTROL DEVICE

(71) Applicant: FUJITSU LIMITED, Kawasaki-shi, Kanagawa (JP)

(72) Inventors: Hiroki Sumida, Mishima (JP); Yasuo Yoshimoto, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 82 days.

(21) Appl. No.: 15/190,293

(22) Filed: Jun. 23, 2016

(65) Prior Publication Data
US 2017/0003977 A1    Jan. 5, 2017

(30) Foreign Application Priority Data
Jul. 3, 2015    (JP) .................. 2015-134339

(51) Int. Cl.
| | | |
|---|---|---|
| G06F 9/00 | (2006.01) | |
| G06F 9/24 | (2006.01) | |
| G06F 15/177 | (2006.01) | |
| G06F 9/455 | (2018.01) | |
| G06F 9/4401 | (2018.01) | |
| G06F 9/50 | (2006.01) | |

(52) U.S. Cl.
CPC ........ G06F 9/45558 (2013.01); G06F 9/4401 (2013.01); G06F 9/50 (2013.01); *G06F 2009/45575* (2013.01)

(58) Field of Classification Search
CPC ....................................................... G06F 9/44
See application file for complete search history.

(56) References Cited

U.S. PATENT DOCUMENTS

| | | | | |
|---|---|---|---|---|
| 5,842,226 A | * | 11/1998 | Barton .................. | G06F 9/5016 711/203 |
| 7,254,504 B2 | * | 8/2007 | Klotz .................... | G01S 13/931 702/85 |
| 2006/0047858 A1 | * | 3/2006 | Atherton ............... | G06F 9/4411 710/1 |
| 2012/0290230 A1 | * | 11/2012 | Berges Gonzalez ... | G01D 4/004 702/61 |

(Continued)

FOREIGN PATENT DOCUMENTS

| | | |
|---|---|---|
| JP | H07-028657 | 1/1995 |
| JP | 2013-008322 | 1/2013 |

(Continued)

*Primary Examiner* — Mohammed Rehman

(74) *Attorney, Agent, or Firm* — Fujitsu Patent Center

(57) ABSTRACT

A non-transitory computer-readable storage medium storing therein a boot control program that causes a computer to execute a process includes storing booting process result data in which a first memory amount based on a sum of a memory amount allocated to a virtual machine that has been booted up and a memory amount allocated to a virtual machine to be booted up, and a boot processing time for booting the virtual machine to be booted up are associated with each other and determining a timing at which a booting process of a new virtual machine starts based on the boot processing time associated with the first memory amount having a correlation with a second memory amount based on a sum of a memory amount.

14 Claims, 17 Drawing Sheets

(56) References Cited

U.S. PATENT DOCUMENTS

| | | | | |
|---|---|---|---|---|
| 2014/0229686 A1* | 8/2014 | Tsirkin | ................ | G06F 9/45533 |
| | | | | 711/147 |
| 2015/0261576 A1* | 9/2015 | Gong | ................... | G06F 9/5016 |
| | | | | 711/6 |

FOREIGN PATENT DOCUMENTS

| JP | 2013008322 A | * | 1/2013 | ............. | G06F 13/10 |
|---|---|---|---|---|---|
| JP | 2013-152513 | | 8/2013 | | |

\* cited by examiner

FIG.9

TBL1

| LOG No. | BOOT TIME POINT | PM_id | VM_id | BOOT PROCESSING TIME BT |
|---|---|---|---|---|
| 001 | 2015/01/08 07:30 | PM1 | VM2 | BT001 |
| 002 | 2015/01/08 07:40 | PM1 | VM3 | BT002 |
| 003 | 2015/01/08 08:00 | PM1 | VM1 | BT003 |
| 004 | 2015/01/08 08:10 | PM1 | VM4 | BT004 |

FIG.10

TBL2

| DATA No. | TIME POINT | PM_id | VACANT MEMORY AMOUNT(GB) | SWAPPED-OUT MEMORY AMOUNT(GB) |
|---|---|---|---|---|
| 000 | 2015/01/08 07:20 | PM1 | 32 GB | 0 |
| 001 | 2015/01/08 07:30 | PM1 | 20 GB | 0 |
| 002 | 2015/01/08 07:40 | PM1 | 4 GB | 0 |
| 003 | 2015/01/08 08:00 | PM1 | 0 | 24 GB |
| 004 | 2015/01/08 08:10 | PM1 | 0 | 36 GB |

FIG.11

TBL3

| DATA No. | PM_id | TOTAL MOUNTED MEMORY AMOUNT(GB) |
|---|---|---|
| 001 | PM1 | 32 GB |
| 002 | PM2 | 64 GB |
| 003 | PM3 | 64 GB |
| 004 | PM4 | 128 GB |

FIG.12

TBL4

| SCHEDULE No. | PM_id | VM_id | Action | WEEKLY SCHEDULE (SMTWTFS) | TIME |
|---|---|---|---|---|---|
| 001 | PM1 | VM1 | ON | 0111110 | 08:00 |
| 002 | PM1 | VM1 | OFF | 0111110 | 22:30 |
| 003 | PM1 | VM2 | ON | 0111110 | 07:30 |
| 004 | PM1 | VM2 | OFF | 0111110 | 22:00 |
| 005 | PM1 | VM3 | ON | 0111110 | 07:40 |
| 006 | PM1 | VM3 | OFF | 0111110 | 21:00 |
| 007 | PM1 | VM4 | ON | 0111110 | 08:10 |
| 008 | PM1 | VM4 | OFF | 0111110 | 22:20 |

FIG.13

| DATA No. | PM_id | VM_id | ALLOCATED (SCHEDULED) MEMORY AMOUNT(GB) |
|---|---|---|---|
| 001 | PM1 | VM1 | 28 GB |
| 002 | PM1 | VM2 | 12 GB |
| 003 | PM1 | VM3 | 16 GB |
| 004 | PM1 | VM4 | 12 GB |

TBL5

FIG.14

TBL6

| RESULT No. | BOOT TIME POINT | PM_id | TOTAL MOUNTED MEMORY AMOUNT | VM_id | ALLOCATED MEMORY AMOUNT | TOTAL ALLOCATED MEMORY AMOUNT | OVER-COMMITMENT RATIO | DEFICIENT MEMORY AMOUNT (MEMORY AMOUNT TAKEN FROM OTHER VMS DURING BOOTING) | BOOT PROCESSING TIME BT |
|---|---|---|---|---|---|---|---|---|---|
| 001 | 2015/01/08 07:30 | PM1 | 32GB | VM2 | 12GB | 12GB | 12/32 | 0 | BT001 |
| 002 | 2015/01/08 07:40 | PM1 | 32GB | VM3 | 16GB | 28GB | 28/32 | 0 | BT002 |
| 003 | 2015/01/08 08:00 | PM1 | 32GB | VM1 | 28GB | 56GB | 56/32 | 24 GB | BT003 |
| 004 | 2015/01/08 08:10 | PM1 | 32GB | VM4 | 12GB | 68GB | 68/32 | 12 GB | BT004 |

FIG.15

TBL7

| ESTIMATION No. | DEFICIENT MEMORY AMOUNT (MEMORY AMOUNT TAKEN FROM OTHER VMS) | ESTIMATED DELAY TIME |
|---|---|---|
| 001 | 8 GB | DT_8 |
| 002 | 16 GB | DT_16 |
| 003 | 24 GB | DT_24 |
| 004 | 32 GB | DT_32 |

BOOT CONTROL PROGRAM, BOOT CONTROL METHOD, AND BOOT CONTROL DEVICE

CROSS-REFERENCE TO RELATED APPLICATION

This application is based upon and claims the benefit of priority of the prior Japanese Patent Application No. 2015-134339, filed on Jul. 3, 2015, the entire contents of which are incorporated herein by reference.

FIELD

The present invention relates to a boot control program, a boot control method, and a boot control device.

BACKGROUND

According to cloud computing, a plurality of virtual machines is deployed on a physical machine (an information processing device) in a data center by a virtualization infrastructure (hereinafter referred to as a hypervisor), and the deployed virtual machines construct a service system. A terminal device of a user who uses the service system accesses a virtual machine via a network to use the service system. The user deploys a needed virtual machine on a physical machine to construct a desired service system without procuring a physical machine on his/her own accord.

In cloud computing, when specific virtual machines are concentrated on a physical machine, it is possible to efficiently use hardware which is the physical machine and to save energy and resources.

For example, a hypervisor shares CPU resources with a plurality of virtual machines and changes CPU allocation from a virtual machine that is not using the CPU to a virtual machine that needs the CPU.

Moreover, as for memory resources, the hypervisor frees memory by moving not needed or not urgently needed data in the memory to an external storage device and changes allocation to a virtual machine that needs the memory.

In recent years, a hypervisor can create a memory overcommitment state in which memory equal to or greater than a memory capacity mounted on a physical machine is allocated to a virtual machine. For example, when a hypervisor allocates memory less than a memory capacity to a virtual machine, although the memory usage is relatively high, the CPU usage is low. Thus, from the perspective of the efficiency of a physical machine, it is requested to allocate memory to a virtual machine in a memory overcommitment state (for example, see Japanese Laid-open Patent Publication Nos. 7-28657, 2013-8322, and 2013-152513).

SUMMARY

According to an aspect of the embodiment a non-transitory computer-readable storage medium storing therein a boot control program that causes a computer to execute a process includes: storing, in a storage, booting process result data, when a virtual machine is booted up on an information processing device that generates a virtual machine, in which a first memory amount based on a sum of a memory amount allocated to a virtual machine that has been booted up on the information processing device and a memory amount allocated to a virtual machine to be booted up on the information processing device, and a boot processing time for booting the virtual machine to be booted up are associated with each other; and determining a timing at which a booting process of a new virtual machine starts, when the new virtual machine is booted up at a predetermined boot timing, based on the boot processing time associated with the first memory amount having a correlation with a second memory amount based on a sum of a memory amount allocated to the virtual machine that has been booted up on the information processing device and a memory amount allocated to the virtual machine to be newly booted up on the information processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a booting process event log.

FIG. 10 illustrates an example of data collected by a service quality coordinator (SQC which is a program) mounted on the physical machine PM1.

FIG. 11 is a diagram illustrating an example of data of a total amount of memory mounted on a physical machine.

FIG. 12 is a diagram illustrating an example of the automated boot control schedule.

FIG. 13 is a diagram illustrating an example of a memory amount allocated (or scheduled to be allocated) to virtual machines.

FIG. 14 is a diagram illustrating an example of the boot processing time result data log.

FIG. 15 is a diagram illustrating an example of the estimated delay time.

DESCRIPTION OF EMBODIMENTS

In a cloud system which uses cloud computing, boot-up and shutdown of a virtual machine is automatically controlled according to a predetermined schedule. In such automated boot control schedule management, each virtual machine needs to be booted up and shut down at the time points as scheduled.

However, in a situation in which the memory overcommitment state is allowed to deploy as many virtual machines as possible, if virtual machines are booted up by automated boot control schedule management, the boot processing time increases due to memory shortage and the booting process is not completed as scheduled. In particular, when the scheduled boot time points of a plurality of virtual machines occur in a short period in a concentrated manner, a particularly serious situation may occur. The first embodiment will be explained hereinbelow.

Figure 1:
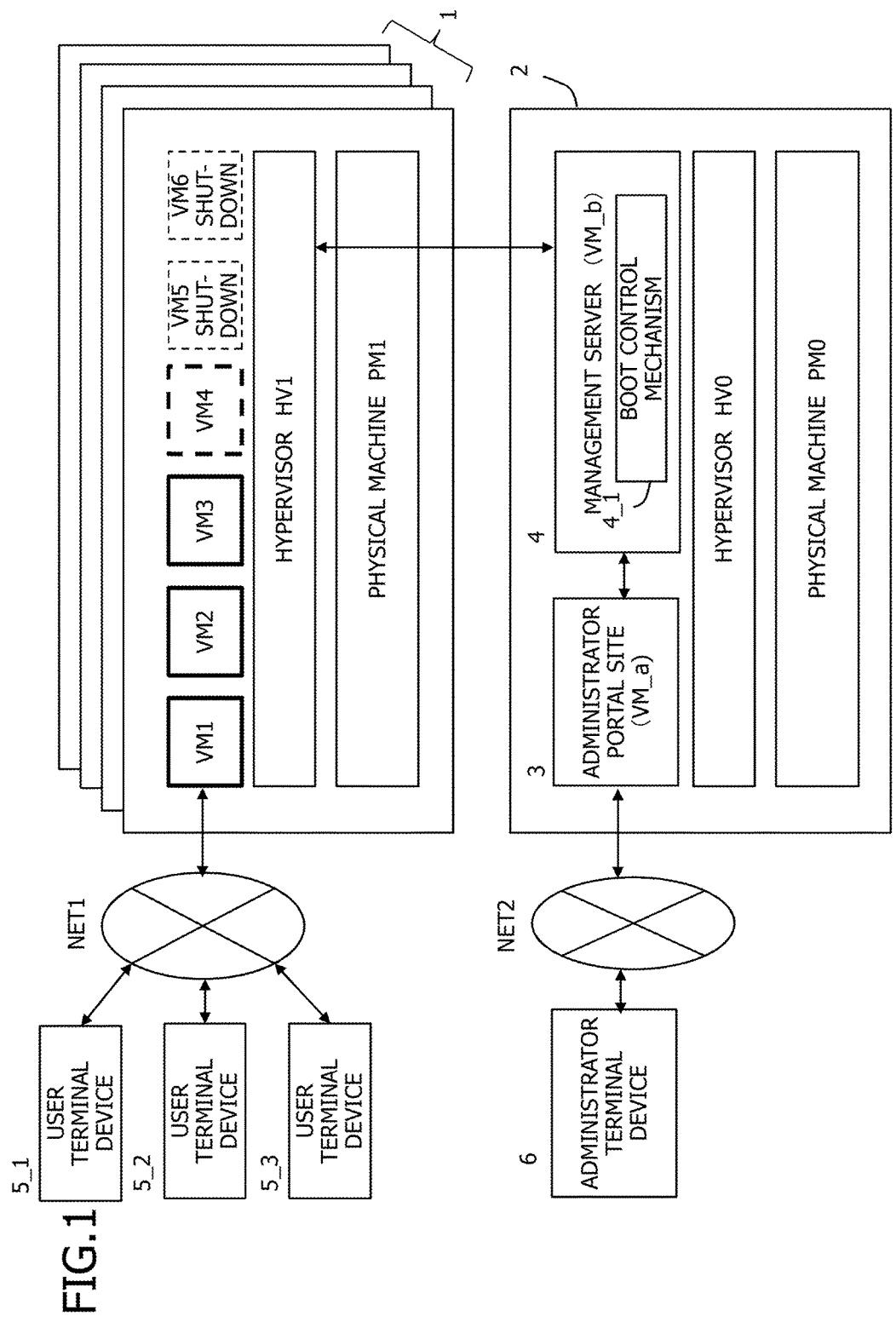
FIG. 1 is a diagram illustrating a cloud system which uses cloud computing according to the present embodiment.

FIG. 1 is a diagram illustrating a cloud system which uses cloud computing according to the present embodiment. The cloud system includes a physical machine group 1 having a plurality of physical machines which are information processing devices and a management physical machine 2 in which a system that manages the physical machine group 1 is constructed.

In a certain physical machine PM1 in the physical machine group 1, a plurality of virtual machines VMs is booted up and generated or deployed by a virtualization function of a hypervisor HV1. In the example of FIG. 1, three virtual machines VM1 to VM3 are already booted up, one virtual machine VM4 is to be newly booted up, and two virtual machines VM5 and VM6 are shut down. Various service systems are constructed by the virtual machines VM1 to VM3 generated on each physical machine PM1 in the physical machine group 1. Moreover, terminal devices 5_1 to 5_3 of users who use each service system access the virtual machines VM1 to VM3 that construct the service system via a first network NET1 to use the respective service systems.

On the other hand, in a physical machine PM0 of the management physical machine 2, by the virtualization function of the hypervisor HV0, a virtual machine VM_a that forms an administrator portal site 3 and a virtual machine VM_b that forms a management server 4 that operates and manages the plurality of virtual machines in the physical machine group 1 are booted up and are in operation.

A terminal device 6 of an administrator of the cloud system accesses the administrator portal site 3 via a second network NET2 to issue a request such as registration, booting, or shutdown of virtual machines or to set the automated boot schedule of virtual machines, for example.

On the other hand, the management server 4 causes the hypervisor HV1 of the physical machine group 1 to boot or shut down a virtual machine based on the request from the terminal device 6 of the administrator. Moreover, the management server 4 obtains various items of status information of the physical machine group 1 from the hypervisor HV1 or the like and provides the status information to be used for the operational management by the administrator.

Further, the management server 4 includes a boot control mechanism 4_1 that performs boot control of booting a virtual machine VM on the physical machine group 1 based on the automated boot schedule set by the administrator. This boot control mechanism 4_1 predicts a boot processing time of a virtual machine that is expected to be booted up and adjusts the booting process start timing (boot time point or scheduled boot time point) so that a booting process can be completed at the boot timing of the automated boot schedule. The details thereof will be described later.

Figure 2:
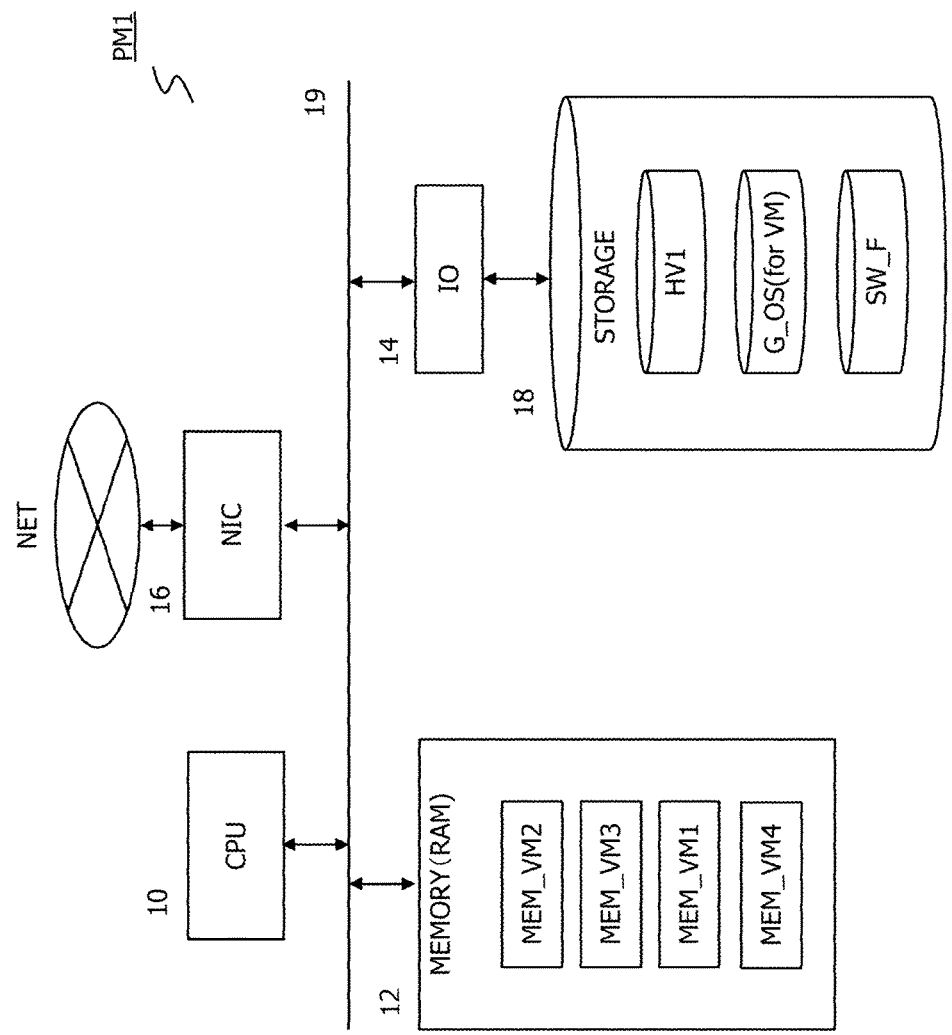
FIG. 2 is a diagram illustrating a configuration of one physical machine PM1 in the physical machine group 1.

FIG. 2 is a diagram illustrating a configuration of one physical machine PM1 in the physical machine group 1. The physical machine PM1 includes a central processing unit (CPU) 10, a memory 12 which is a main memory, a network interface device (network interface card) 16 connected to a network NET, a storage 18 which is a large-capacity storage device like a hard disk, and a bus 19 that connects these components similarly to a general computer (information processing device). The storage 18 is connected to the bus 19 via an input/output device 14.

The hypervisor HV1 and a guest operating system (OS) G_OS of each virtual machine VM are stored in the storage 18. The hypervisor HV1 and the guest OS G_OS are loaded into the memory 12 and are executed by the CPU 10. Moreover, an application program (not illustrated) executed by each virtual machine is stored in the storage 18.

Further, a swap file SW_F to which data in the memory 12, which has not been used recently or used less frequently, for example, is copied and swapped out is stored in the storage 18.

This swap file will be described briefly. That is, the hypervisor HV1 copies data of a memory area which has not been used recently or used less frequently among memory areas allocated to booted-up virtual machines to the swap file SW_F in the external storage 18 as a part of memory management. Moreover, the hypervisor HV1 performs a swap process of releasing the memory area from the allocation to virtual machines and allocating the memory area to a new virtual machine that needs the memory area. With this swap process, the hypervisor HV1 can allocate a memory area exceeding a total capacity of the mounted memory 12 to virtual machines. Moreover, the hypervisor HV1 compresses data of a memory area which has not been used recently, for example, among the memory areas allocated to booted-up virtual machines to secure a vacant area and allocates the memory area to a new virtual machine that needs the memory area.

The hypervisor HV1 allocates the CPU 10 or a core in the CPU to the booted-up virtual machine based on information that defines the configuration of a virtual machine, allocates a requested memory amount from memory, allocates a requested storage capacity from the storage 18, and allocates a requested network bandwidth. Among these allocations, the hypervisor maintains the allocation of memory to virtual machines by a memory management function.

For example, it is assumed that the virtual machines VM2, VM3, VM1, and VM4 have been booted up on the physical machine PM1 of FIG. 2. Due to this, the hypervisor HV1 allocates memory areas MEM_VM1 to MEM_VM4 in the memory 12 to the four virtual machines VM1 to VM4, respectively. Moreover, the hypervisor HV1 can allocate a memory area exceeding the total capacity of the memory 12 to the virtual machines VM1 to VM4. In a memory overcommitment state in which memory exceeding such a mounted memory amount is allocated, the hypervisor compresses a part of the data in the memory by the memory management function or copies the data in the memory to the swap file SW_F in the storage 18. Thus, as the degree of memory overcommitment increases, the hypervisor falls into a busier state due to the memory management process.

Figure 3:
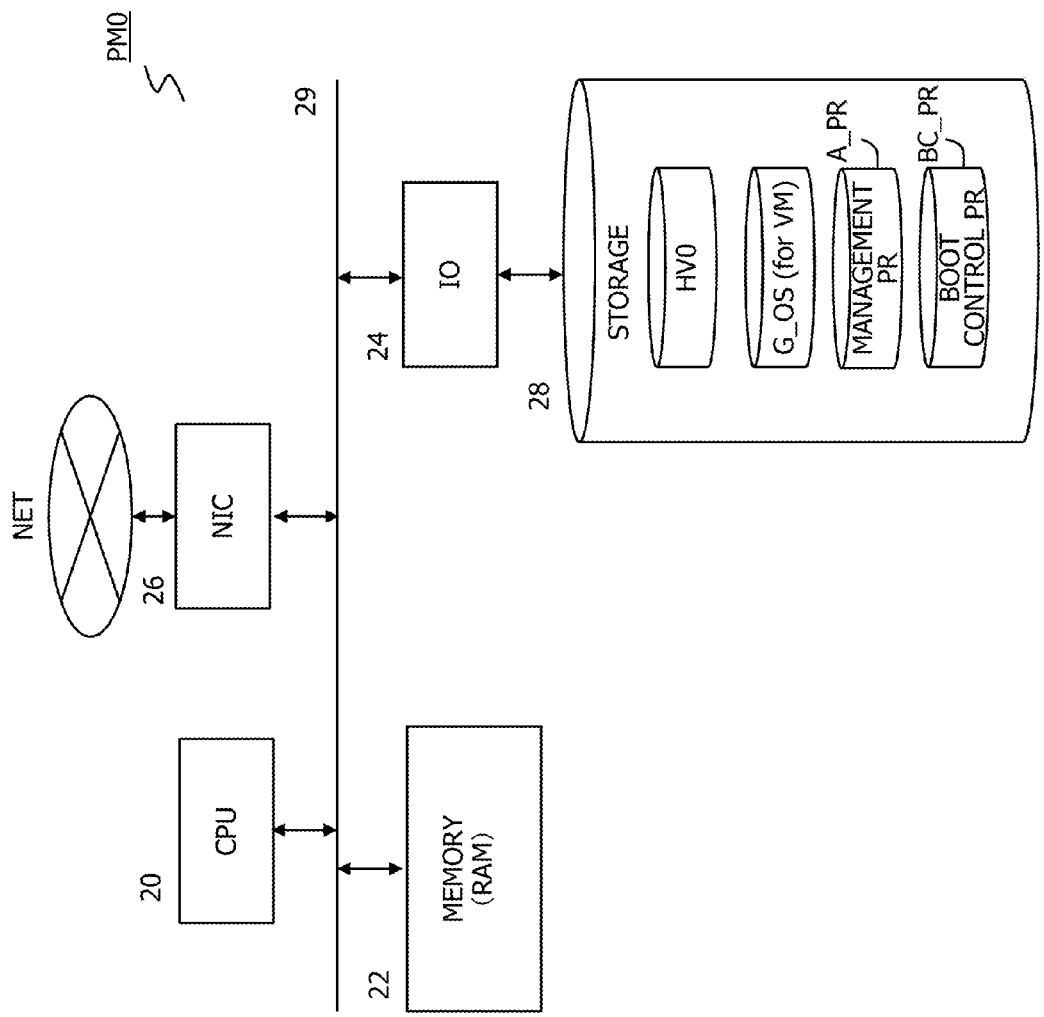
FIG. 3 is a diagram illustrating a configuration of the physical machine PM0 in a management physical machine.

FIG. 3 is a diagram illustrating a configuration of the physical machine PM0 in a management physical machine. The physical machine PM0 includes a CPU 20, a memory 22 which is a main memory, a network interface device 26 connected to a network NET, a storage 28, an input/output device 24 of the storage 28, and a bus 29 that connects these components similarly to the physical machine PM1 of FIG. 2.

A hypervisor HV0 and a guest OS G_OS of each virtual machine VM are stored in the storage 28. Further, a management program A_PR that manages the virtual machines VMs generated in the physical machine group 1 and a boot control program BC_PR that realizes the boot control mechanism 4_1 are stored in the storage 28. These software components are loaded into the memory 22 and are executed by the CPU 20.

[Memory Overcommitment and Memory Management]

In the cloud system illustrated in FIG. 1, the hypervisor HV1 boots a number of virtual machines VMs on the physical machine PM1 and controls the operations of the virtual machines VMs. It is proved that the CPU resources are not used efficiently when the hypervisor HV1 boots and operates the virtual machines VMs without allocating a memory area smaller than the total memory capacity to the virtual machines VMs. For example, even when the memory usage in the physical machine PM1 exceeds 80%, the CPU usage is sometimes smaller than 20%. This is because all of the booted-up virtual machines VMs are rarely in an active state but many of the virtual machines VMs are generally in an idle state.

Thus, in the present embodiment, the hypervisor HV1 allows virtual machines to enter into a memory overcommitment state in which a memory area exceeding a total memory capacity is allocated to a plurality of virtual machines VMs. With such memory allocation, it is possible to increase the CPU usage and to realize efficient use of hardware resources. To allow the memory overcommitment state, the hypervisor HV1 executes the following memory control.

Figure 4:
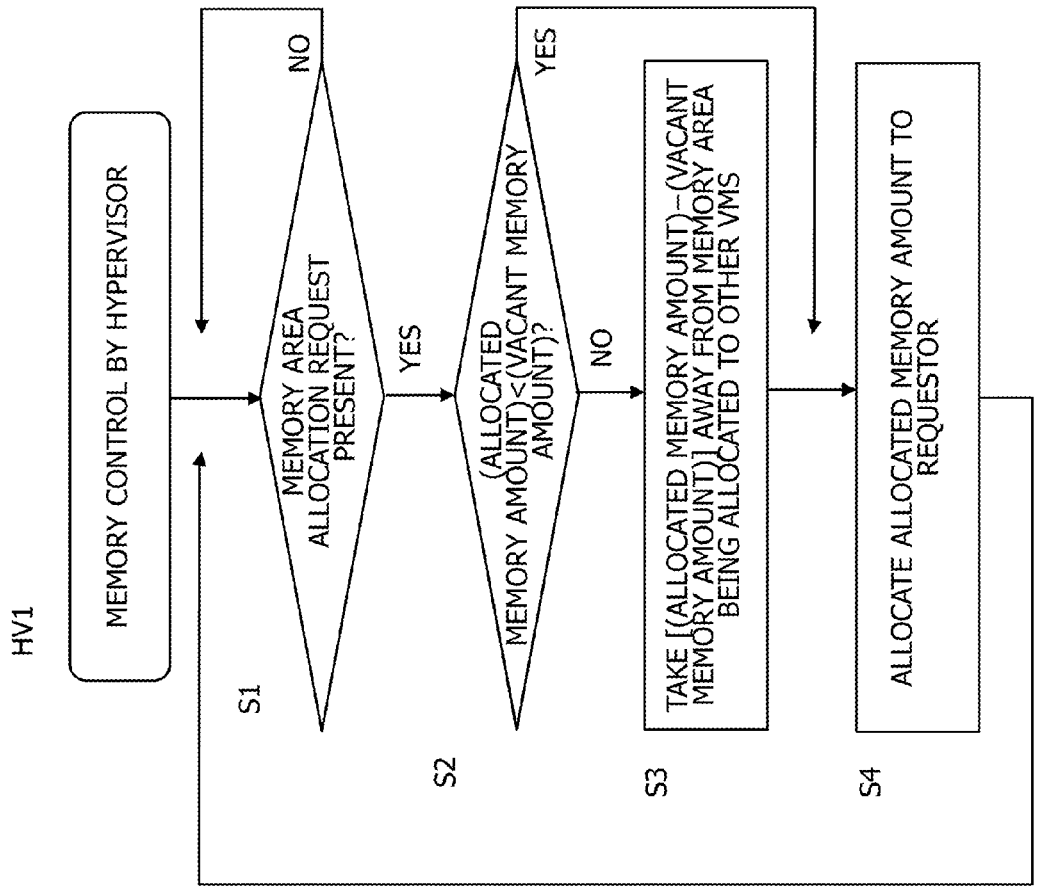
FIG. 4 is a diagram illustrating an example of memory control by the hypervisor HV1.

FIG. 4 is a diagram illustrating an example of memory control by the hypervisor HV1. When a memory area allocation request occurs (S1: YES) and the vacant memory amount is equal to or larger than a requested memory amount (S2: YES), the hypervisor allocates a vacant memory area to the requestor (S4). However, when the vacant memory amount is smaller than the requested memory amount (S2: NO), the hypervisor executes a process of taking (or acquiring, the same hereinbelow) a memory amount obtained by subtracting the vacant memory amount from the requested memory amount away from a memory area being allocated to other virtual machines (S3). The requestor that issues the memory area allocation request is a booted-up virtual machine or a boot program used when booting a virtual machine, for example.

The memory amount taken away from the memory area being allocated to other virtual machines is a memory amount that is deficient in complying with the memory allocation request. The process of taking the deficient memory amount from the memory allocated to other virtual machines is a part of a memory management process of the hypervisor. Specifically, examples of the memory management process include a process of compressing data which has not been used recently to free the memory area and a process of copying the data which has not been used recently to a swap file in the storage 18 to free the memory area.

In this manner, when a memory allocation request occurs when a new virtual machine is booted up in a memory overcommitment state, the hypervisor HV1 executes the process (S3) of taking the deficient memory amount from the memory area being allocated to other virtual machines. Moreover, the hypervisor HV1 also performs the process of taking the deficient memory amount when a booted-up virtual machine returns to an active state from an idle state in a memory overcommitment state and accesses the memory.

[Virtual Machine Booting Process]

Figure 5:
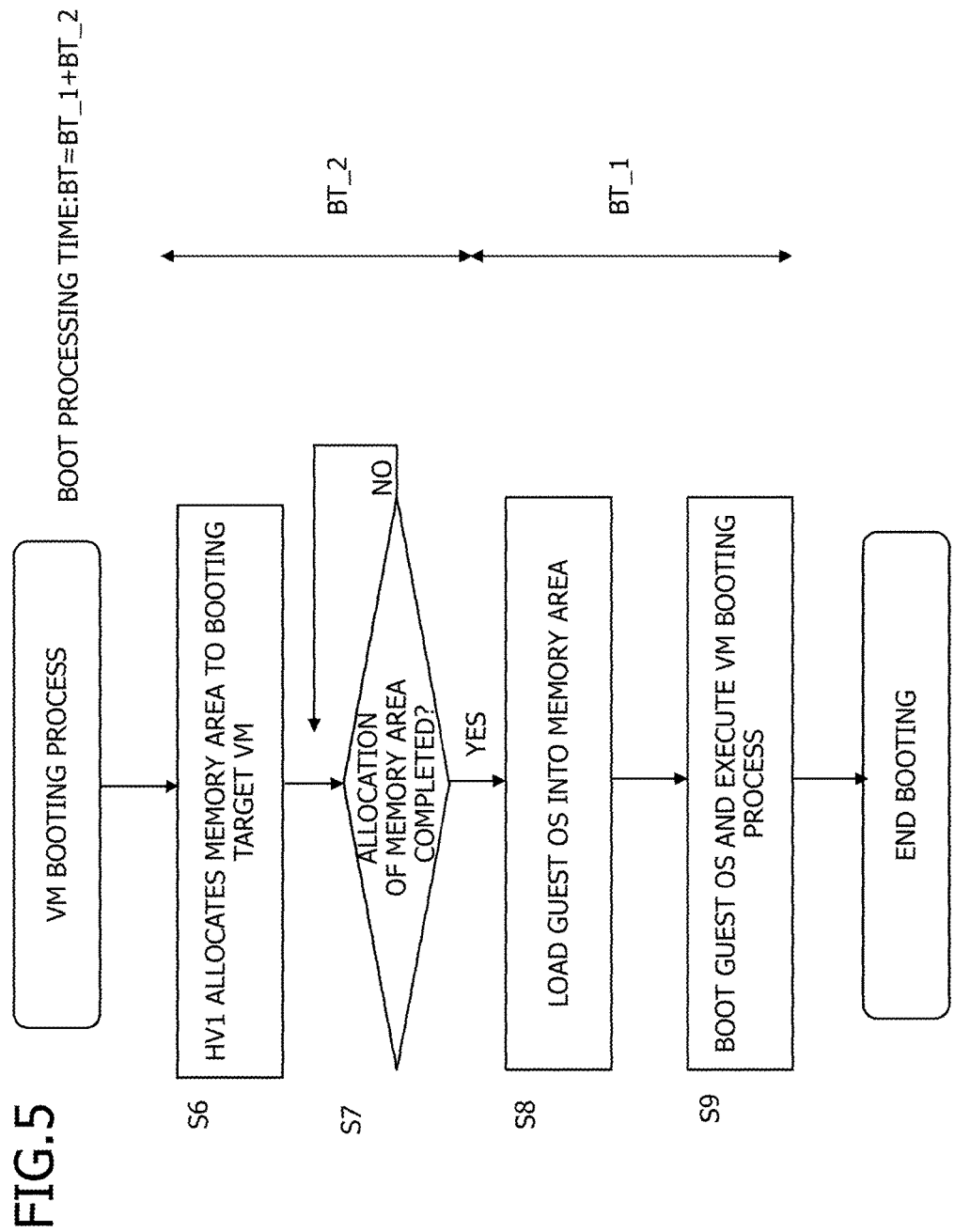
FIG. 5 is a diagram illustrating an outline of a virtual machine booting process.

FIG. 5 is a diagram illustrating an outline of a virtual machine booting process. The virtual machine booting process includes allocation (S6) of a memory area to a virtual machine by the hypervisor HV1, loading (S8) of a guest OS into an allocated memory area, and a booting process (S9) by the guest OS. When booting of a new virtual machine starts, first, the hypervisor HV1 allocates a memory area to a booting target virtual machine (S6). This allocation process is a process of allocating the requested memory amount to a requestor as described in the memory control by the hypervisor in FIG. 4.

Thus, when a vacant memory amount in the memory is equal to or larger than the requested memory amount, the hypervisor completes the memory area allocation process in a short time. However, when the vacant memory amount in the memory is smaller than the requested memory amount, the hypervisor executes the process (S3 in FIG. 4) of taking the deficient memory amount away from the memory area being allocated to other booted-up virtual machines. The time needed for the process of taking the deficient memory capacity away from other virtual machines varies depending on the size of the deficient memory amount, the access frequency (the use frequency of the IO interface device 14, for example) of the storage 18, the busy state of the hypervisor, and the like.

In FIG. 5, when the allocation of the memory area is completed (S7: YES), the hypervisor HV1 loads the guest OS into the allocated memory area in the storage 18 and the boot control is handed over to the guest OS (S8). After that, the CPU accesses the guest OS loaded into the memory to boot up the guest OS and executes a booting process including an initialization process needed for booting of virtual machines (S9).

As described above, the boot processing time (BT: boot time) of a virtual machine is the sum (BT=BT1+BT2) of the time BT2 needed for allocating a memory area to a virtual machine and the time BT1 taken until a guest OS is loaded into a memory area (S8) and the guest OS completes a virtual machine booting process. Moreover, the memory area allocation time BT2 is different depending on whether the memory is in a memory overcommitment state.

That is, if the memory is not in the memory overcommitment state, the hypervisor just allocates the requested memory amount from the vacant memory area, and it can be said that the memory area allocation time BT2 is very short and is substantially zero. However, when the memory is in the memory overcommitment state, since the hypervisor performs a process of taking the deficient memory amount from the memory being allocated to other virtual machines, the memory area allocation time BT2 increases.

Further, the memory area allocation time BT2 in the memory overcommitment state varies depending on the size of the memory amount (the memory amount taken away from the memory being allocated to other virtual machines) deficient in allocating memory to a virtual machine to be newly booted up (the larger the deficient memory amount, the longer the time). Moreover, the memory area allocation time BT2 increases depending on the degree of memory overcommitment (the higher the degree, the longer the time). This is because, if the degree of memory overcommitment is high, the hypervisor will be busy with the memory management process. Further, the memory area allocation time BT2 is different depending on various other factors (for example, a storage access frequency during a swap-out process, a service system access frequency, and the like).

The degree of memory overcommitment state is a memory overcommitment ratio obtained by dividing a total amount of memory allocated to virtual machines by a total mounted memory amount. Alternatively, the degree of memory overcommitment state is an excess memory amount obtained by subtracting a total mounted memory amount from a total amount of memory allocated to virtual machines. It is expected that, if the memory overcommitment ratio or the excess memory amount increases, a lot of time is taken in the process of the hypervisor taking the deficient memory amount away from other virtual machines.

Thus, when control is performed to allow the memory overcommitment state to be created by the hypervisor HV1 to increase the CPU usage, the memory area allocation time BT2 within the boot processing time BT (=BT1+BT2) needed when booting a virtual machine according to an automated boot control schedule varies primarily depending on the deficient memory amount (the larger the deficient memory amount, the longer the time). Further, the memory area allocation time BT2 also varies depending on the degree of memory overcommitment state as well as the deficient memory amount (the higher the degree, the longer the time). A delay time in the booting process resulting from the memory area allocation time BT2 increases further when the schedule is set so that a plurality of virtual machines is booted up in a concentrated period of time. Due to this, it is expected that, if the memory overcommitment state is allowed, the virtual machine booting process is not completed at the boot timing set in the automated boot control schedule but is delayed drastically.

[Boot Control Based on Boot Control Program]

The boot control mechanism 4_1 (the boot control program BC_PR) of the management server 4 of the present embodiment adjusts the boot time point (or the scheduled boot time point) of each virtual machine set in the automated boot control schedule so as to occur earlier by a predicted delay time at the scheduled boot time point. The expected boot delay time at the scheduled boot time point varies primarily due to variation in the memory area allocation time BT2 as described above. Thus, the boot time point may be adjusted so as to occur earlier by the predicted boot processing time at the scheduled boot time point. However, since the time BT1 within the boot processing time BT (=BT1+BT2) is a substantially constant short period regardless of the memory overcommitment state, the automated boot control schedule is often set according to the time BT1. Thus, the boot time point may be adjusted so as to occur earlier by the predicted delay time as described above.

Thus, in first boot control, the boot control program BC_PR predicts the delay time resulting from the memory area allocation time BT2 based on a memory amount (the memory amount taken away from the memory being allocated to other virtual machines) that is deficient when allocating the memory to a booting machine, predicted at the scheduled boot time point, and adjusts the scheduled boot time point so as to occur earlier by the predicted boot processing time BT (=BT1+BT2) (or the predicted delay time BT2). Further, the boot control program BC_PR preferably predicts the delay time resulting from the memory area allocation time BT2 based on the degree of memory overcommitment as well as the deficient memory amount and adjusts the scheduled boot time point so as to occur earlier by the predicted delay time.

In the first boot control, the delay time is estimates based on the deficient memory amount predicted from the delay time resulting from the memory area allocation time BT2 estimated in advance. Such a delay time prediction process is preferably performed when boot result data of virtual machines is not accumulated or when the boot result data to be referenced is not present.

On the other hand, in second boot control, the boot control program stores the deficient memory amount, the degree of memory overcommitment, and the boot processing time BT in association with one another as a result data log of the boot processing time. Moreover, when the scheduled boot time point is adjusted, the boot control program extracts the boot processing time BT in the result data log correlated with (identical or close to) the predicted deficient memory amount within the result data log of an adjustment target virtual machine and adjusts the scheduled boot time point so as to occur earlier based on the boot processing time BT. Further, the boot control program preferably extracts the boot processing time BT in the result data log correlated with the degree of the predicted memory overcommitment within the result data log correlated with the predicted deficient memory amount and adjust the scheduled boot time point based on the boot processing time BT.

As described above, in the second boot control, when sufficient boot processing time result data is accumulated, the boot processing time in the result data correlated with the deficient memory amount within the result data log of the adjustment target virtual machine is extract to adjust the scheduled boot time point. However, when the result data correlated with the deficient memory amount is not present, the delay time is estimated based on the deficient memory amount predicted from the delay time resulting from the memory area allocation time BT2 predicted in advance similarly to the first boot control.

When the result data of the adjustment target virtual machine is not present in the result data log, the boot processing time in the result data correlated with the deficient memory amount of a different virtual machine may be extracted to adjust the scheduled boot time point. This is because, if the physical machine is the same, the boot delay time is different primarily depending on the deficient memory amount.

The deficient memory amount (the memory amount taken away from the memory allocated to other virtual machines) when a new virtual machine is booted up is in close relation or in correlation with the sum of the memory amount allocated to booted-up virtual machines and the memory amount to be allocated to a virtual machine to be newly booted up. For example, the total amount of memory mounted on a physical machine on which an adjustment target virtual machine is booted up is the same. Thus, the total amount of memory allocated to booted-up VMs and an adjustment target VM is in one-to-one correspondence with the deficient memory amount predicted during booting of the adjustment target virtual machine to be newly booted up if the swapped-out memory amount in the result data and the predicted swapped-out memory amount are known. However, it is assumed that the vacant memory amount is zero. Thus, the total allocated memory amount is a value corresponding to the deficient memory amount of the adjustment target virtual machine to be newly booted up. Further, since the total amount of memory mounted on the physical machine is the same, the total allocated memory amount is also a value corresponding to the degree of memory overcommitment after booting.

Thus, in the first and second boot control, the sum of the memory amount allocated to booted-up virtual machines and the memory amount allocated to a virtual machine to be newly booted up may be stored in the result data log instead of the deficient memory amount (the memory amount taken away from the memory allocated to other virtual machine), and the boot time point may be adjusted with reference to the boot processing time in the result data log correlated with the predicted total allocated memory amount during adjustment of the boot time point.

[First Boot Control]

Figure 6:
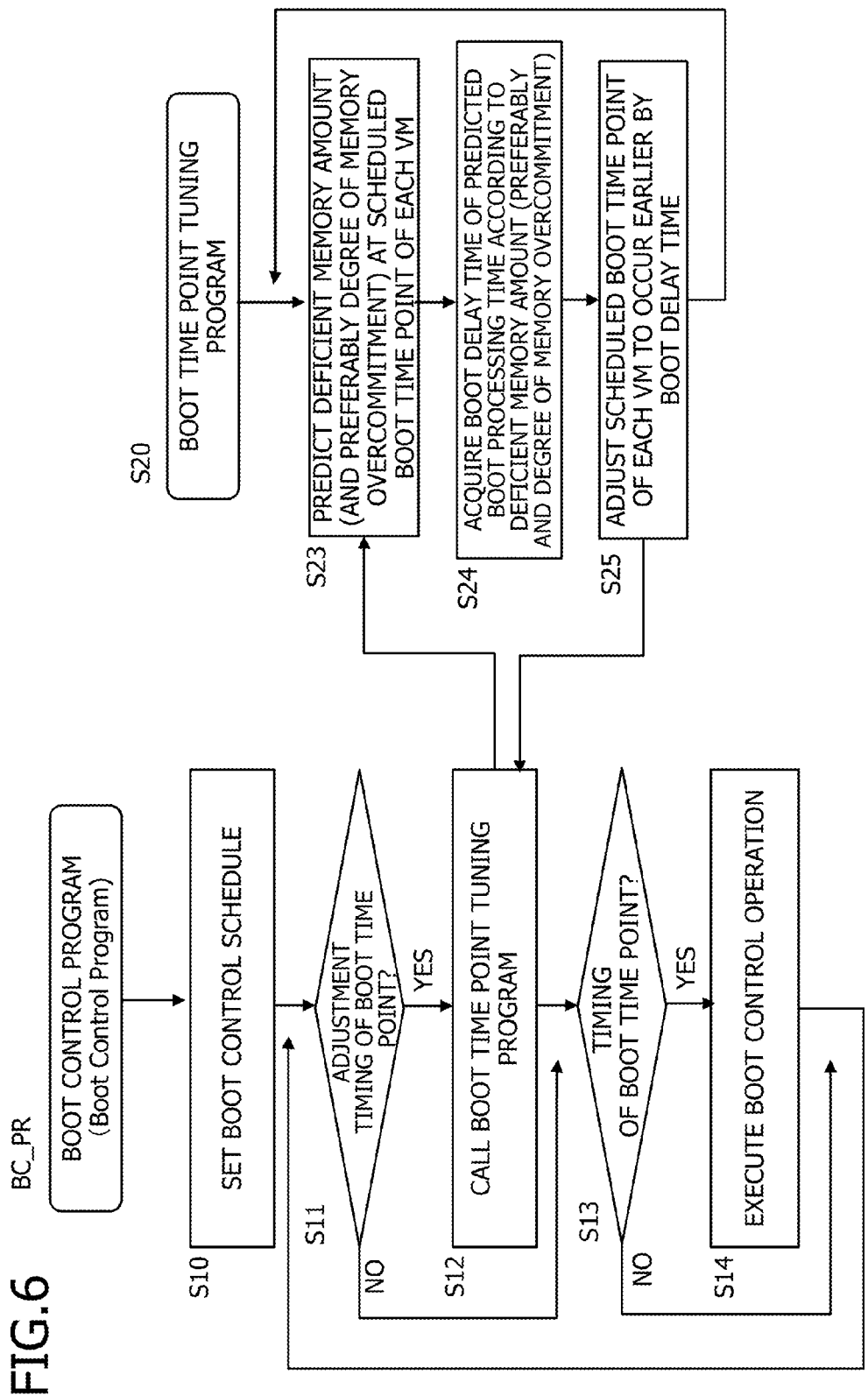
FIG. 6 is a flowchart illustrating the process of the automated boot control of virtual machines by the boot control mechanism 4_1 (the boot control program BC_PR) according to the first boot control.

FIG. 6 is a flowchart illustrating the process of the automated boot control of virtual machines by the boot control mechanism 4_1 (the boot control program BC_PR) according to the first boot control. As a premise, the automated boot control schedule is set by an administrator or the like that operates a cloud system (S10).

FIG. 12 is a diagram illustrating an example of the automated boot control schedule. A table TBL4 in FIG. 12 illustrates an example of the automated boot control schedule. In this example, the timings at which the virtual machines VM1, VM2, VM3, and VM4 are booted up and shut down are set on the physical machine PM1 as depicted in FIG. 1. For example, in schedule numbers 001 and 002, it is set that the virtual machine VM1 on the physical machine PM1 is booted up (Action: ON) at time 08:00 on Monday to Friday of one week and is shut down (Action: OFF) at time 22:30. The other virtual machines VM2, VM3, and VM4 are set similarly. Thus, in this example, it is set so that the virtual machine VM2 is booted up at time 07:30 on Monday to Friday, the virtual machine VM3 is booted up at time 07:40, the virtual machine VM1 is booted up at time 08:00, and the virtual machine VM4 is booted up at time 08:10.

Subsequently, when a boot time point adjustment timing occurs (S11: YES), the boot control program calls a boot time point tuning program (S12). For example, the boot time point adjustment timing is the timing at which an administrator sets the automated boot control schedule of virtual machines, the timing at which the setting is changed, and the timing at which an event of a booting process and a shutdown process of a virtual machine occurs. At these timings, the memory amount deficient in allocating memory when a new virtual machine is booted up and the degree of memory overcommitment state vary. Accordingly, since the predicted deficient memory amount and the degree of memory overcommitment state vary, it is needed to readjust the scheduled boot time point.

When the timing of the boot time point (scheduled boot time point) occurs (S13: YES), the boot control program executes the boot control operation to instruct the hypervisor to perform a virtual machine booting process (S14).

On the other hand, in response to the call S12, the boot time point tuning program S20 estimates the delay time (BT2) in the boot processing time predicted at the scheduled boot time point, adjusts the scheduled boot time point so as to occur earlier by the delay time, and returns the adjusted scheduled boot time point to the boot control program.

Specifically, the boot time point tuning program predicts the deficient memory amount (the memory amount taken away from other virtual machines) at the scheduled boot time point for each VM in the automated boot control schedule (S23). As described above, the deficient memory amount is a memory amount obtained by subtracting the vacant memory amount from the memory amount allocated to a virtual machine to be newly booted up.

Moreover, the boot time point tuning program predicts the boot delay time (BT2) by estimation according to the deficient memory amount for each VM and acquires the boot delay time in the predicted boot processing time (S24).

FIG. 15 is a diagram illustrating an example of the estimated delay time. This table TBL7 has an estimated delay time DT corresponding to the deficient memory amount (the memory amount taken away from other VMs). This data is set based on an average value or the like in similar cloud computing, for example.

With reference to the table TBL7 in FIG. 15, when the deficient memory amount is 4 GB, the hypervisor estimates the predicted boot delay time DT based on the ratio of the deficient memory amount as follows.

$$DT=(4\ GB/8\ GB) \times DT\_8$$

Alternatively, when the deficient memory amount is 12 GB, the predicted boot delay time DT is estimated by interpolation as follows.

$$DT=DT\_8+(DT\_16-DT\_8) \times (12\ GB-8\ GB)/(16\ GB-8\ GB)$$

Moreover, the boot time point tuning program adjusts the scheduled boot time point in the automated boot control schedule so as to occur earlier by the boot delay time acquired by the estimation for each VM and returns the adjusted scheduled boot time point to the boot control program (S25).

The estimation preferably further includes predicting (S23) the degree of memory overcommitment and calculating (S24) the boot delay time based on the degree of memory overcommitment as well as the deficient memory amount. For example, it is predicted such that the higher the degree of memory overcommitment, the longer the boot delay time.

Finally, when the timing of the boot time point occurs (S13), the boot control program requests the hypervisor HV1 to start a virtual machine booting process at the adjusted scheduled boot time point so that the booting process is performed (S14).

[Second Boot Control]

Figure 7:
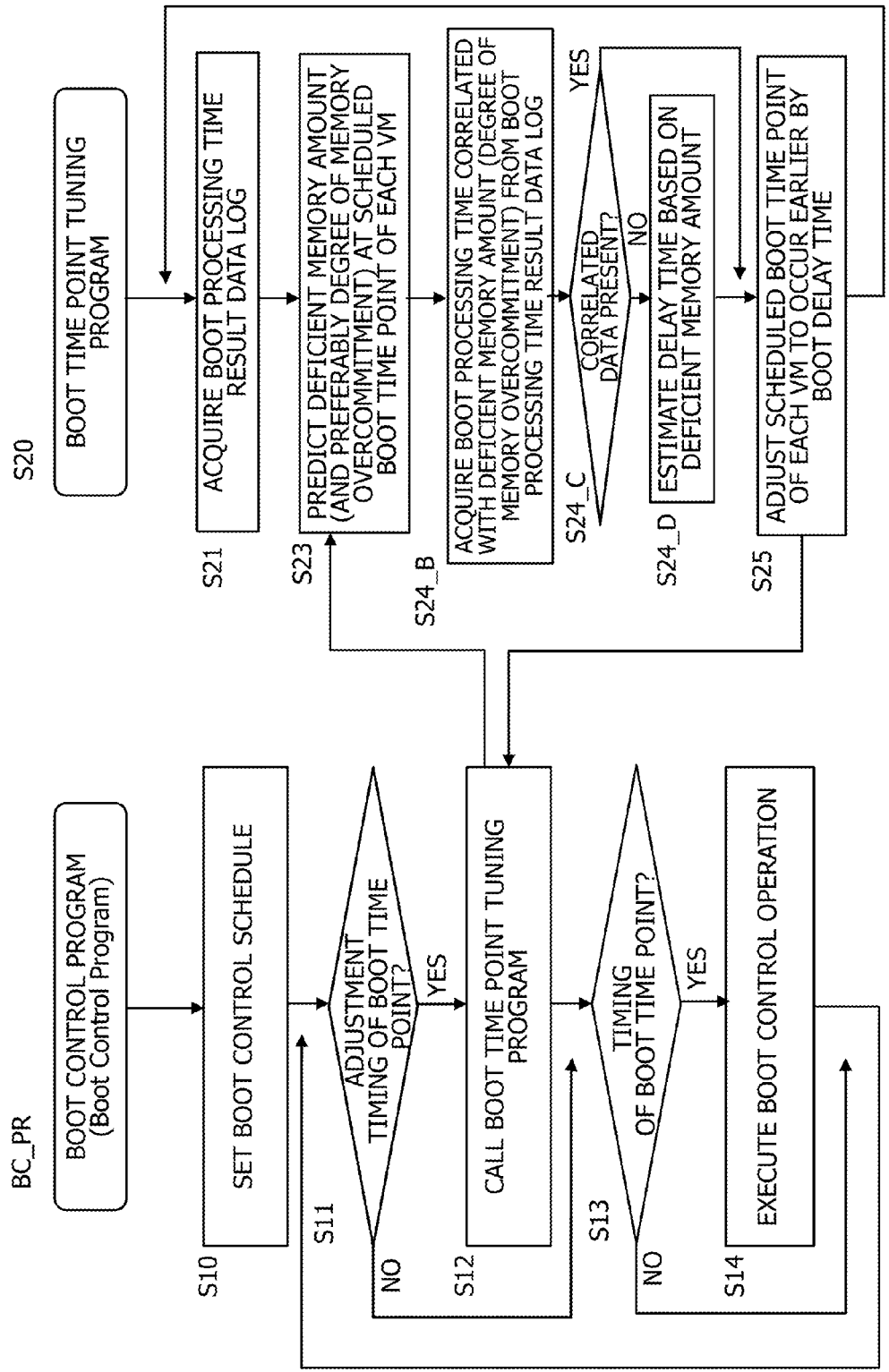
FIG. 7 is a flowchart illustrating the process of the automated boot control of virtual machines by the boot control mechanism 4_1 (the boot control program BC_PR) according to the second boot control.

FIG. 7 is a flowchart illustrating the process of the automated boot control of virtual machines by the boot control mechanism 4_1 (the boot control program BC_PR) according to the second boot control. First, the automated boot control schedule is set by an administrator or the like that operates a cloud system (S10). When a boot time point adjustment timing occurs (S11), the boot control program calls the boot time point tuning program and asks the boot time point tuning program to adjust the scheduled boot time point (boot time point) (S12). The boot time point adjustment timing is as illustrated in FIG. 6.

On the other hand, the boot time point tuning program collects the boot processing time from a booting process event log whenever a virtual machine boot event occurs, calculates the deficient memory amount (the memory amount taken away from other virtual machines) and preferably the degree of memory overcommitment when the virtual machine is booted up, and adds the deficient memory amount and the degree of memory overcommitment to the boot processing time result data log in association with the collected boot processing time (S21). The boot processing time result data log is stored in the storage 18 of the physical machine PM1, for example. The result data is stored as a log unlike the first boot control.

The boot time point tuning program calculates the boot processing time result data for each of virtual machines to be booted up based on data obtained from the hypervisor. The calculation method will be described later.

Subsequently, when called from the boot control program, the boot time point tuning program predicts the deficient memory amount (the memory amount taken away from other virtual machines) at the scheduled boot time point for each VM in the automated boot control schedule (S23).

Moreover, preferably, the degree of memory overcommitment is predicted for each VM. The deficient memory amount is an amount obtained by subtracting the memory amount (scheduled allocated memory amount) allocated to a new virtual machine from the vacant memory amount. The deficient memory amount can be calculated by subtracting the total mounted memory amount and the predicted swapped-out memory amount from the total allocated memory amount. Moreover, the degree of memory overcommitment is a memory overcommitment ratio obtained by dividing the total allocated memory amount by the total mounted memory amount or an excess amount of memory overcommitment obtained by subtracting the total mounted memory amount from the total allocated memory amount.

Subsequently, the boot time point tuning program acquires the boot processing time correlated with a deficient memory amount having a correlation with the deficient memory amount from the boot processing time result data log of an adjustment target virtual machine (S24_B). Moreover, preferably, when a number of deficient memory amounts having a correlation with the deficient memory amount are acquired from the boot processing time result data log, the boot time point tuning program further acquires the boot processing time correlated with a degree of memory overcommitment having a correlation with the degree of memory overcommitment.

When it is not possible to extract the deficient memory amount result data correlated with the deficient memory amount from the boot processing time result data log (S24_C: NO), the boot time point tuning program predicts the boot delay time (BT2) by estimation according to the deficient memory amount similarly to S24 of FIG. 6 and acquires the delay time in the predicted boot processing time (S24_D).

The boot time point tuning program adjusts the scheduled boot time point so as to occur earlier by the delay time of the boot processing time for each VM to generate an adjusted scheduled boot time point, and returns the adjusted scheduled boot time point to the boot control program (S25). When the boot processing time is extracted from the result data in step S24_B, the boot time point tuning program calculates the delay time by subtracting the average value of the boot processing time in the result data indicating that the deficient memory amount is zero from the acquired boot processing time. This is because the delay time BT2 is substantially zero for the boot processing time in the result data indicating that the deficient memory amount is zero.

Finally, when the timing of the boot time point occurs (S13), the boot control program requests the hypervisor HV1 to start a virtual machine booting process at the adjusted scheduled boot time point so that the booting process is performed (S14).

[Specific Example of Second Boot Control]

Next, the second boot control process (FIG. 7) will be described with reference to a specific example.

Figure 16:
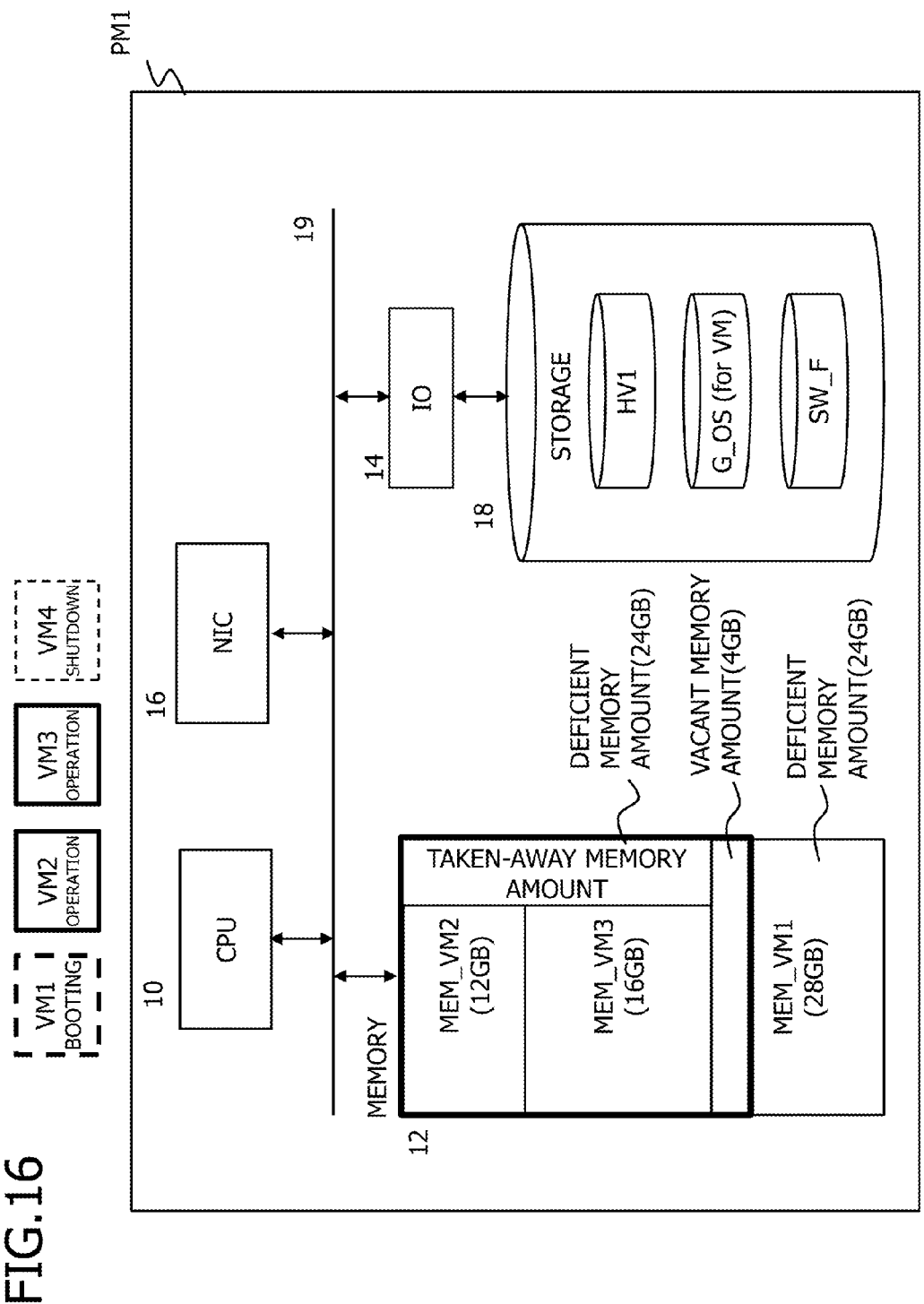
FIG. 16 is a diagram illustrating a specific example of the boot control process.
Figure 17:
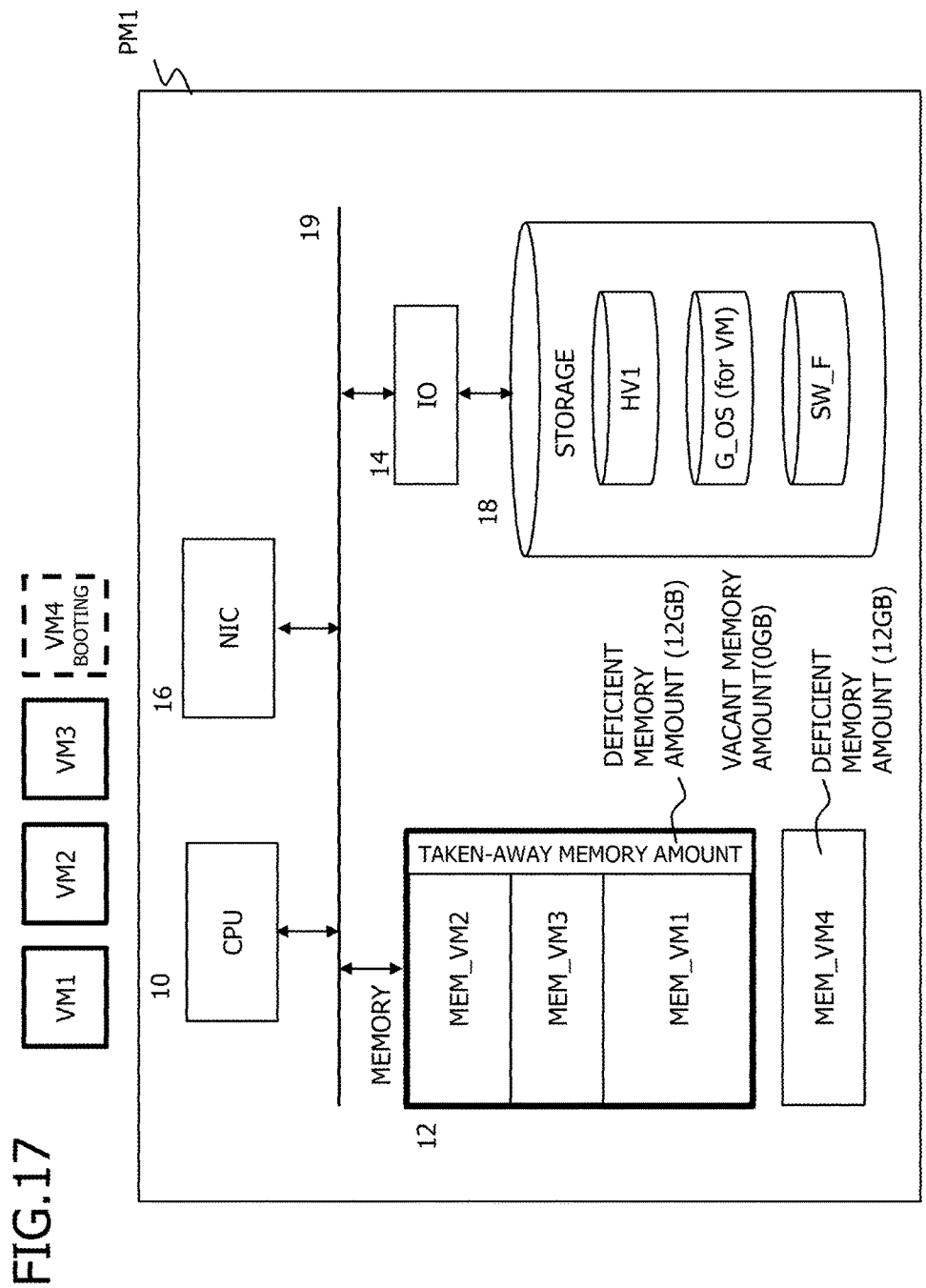
FIG. 17 is a diagram illustrating a specific example of the boot control process.

FIGS. 16 and 17 are diagrams illustrating a specific example of the boot control process. FIG. 16 illustrates an example in which a new virtual machine VM1 is scheduled to be booted up in a state in which the virtual machines VM2 and VM3 are already booted up on the physical machine PM1 and are in operation. FIG. 17 illustrates an example in which a new virtual machine VM4 is scheduled to be booted up in a state in which virtual machines VM2, VM3, and VM1 are already booted up on the physical machine PM1 and are in operation.

In the following specific example, first, the adjustment of the boot time point when the virtual machines VM1 and VM4 are scheduled to be booted up as illustrated in FIGS. 16 and 17 in a state in which the boot processing time result data log is not sufficiently collected will be described. Subsequently, the adjustment of the boot time point when the virtual machines VM1 and VM4 are scheduled to be booted up as illustrated in FIGS. 16 and 17 in a state in which the boot processing time result data log is sufficiently collected will be described.

Figure 8:
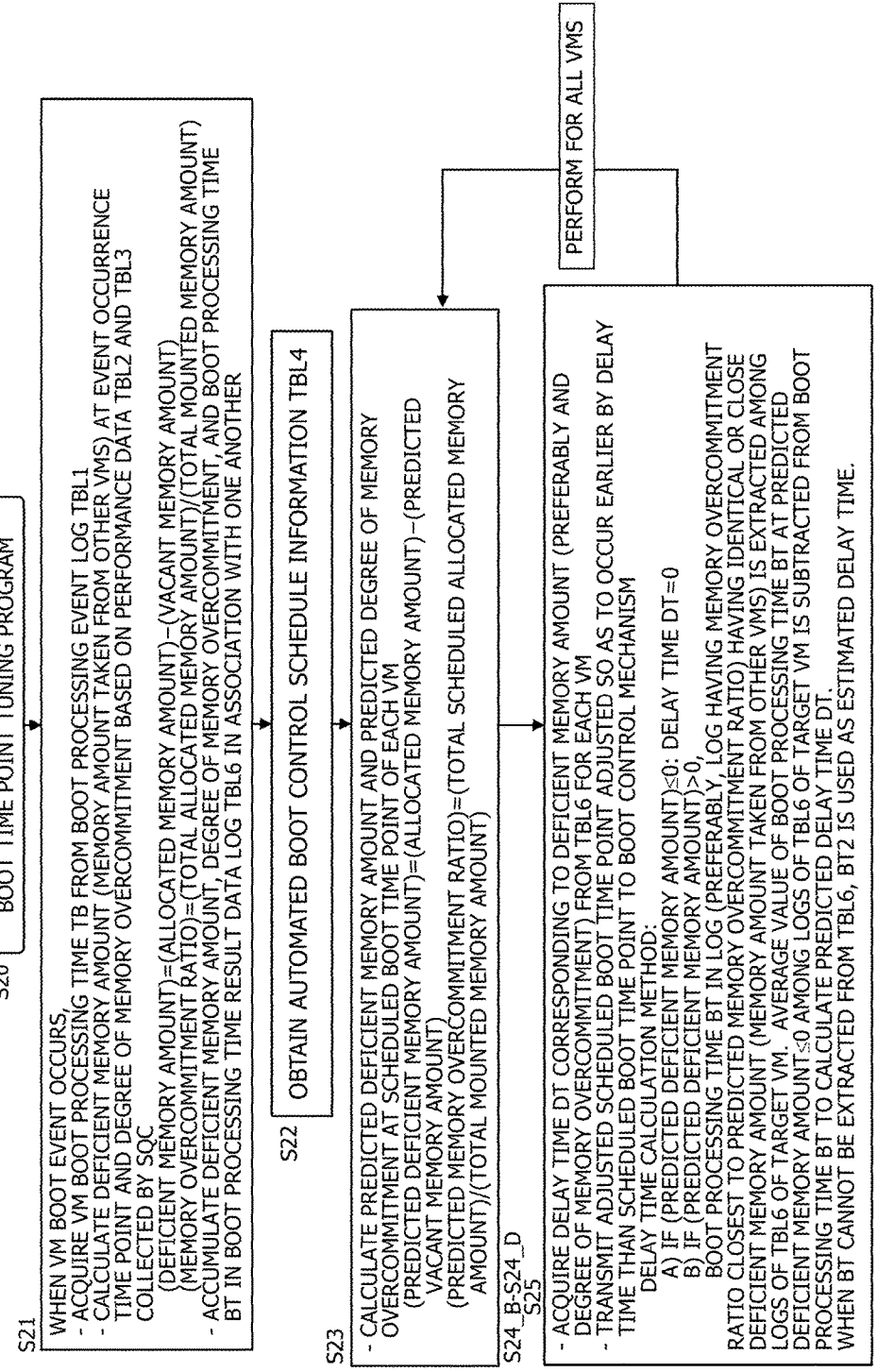
FIG. 8 is a flowchart illustrating the detailed processes of the boot time point tuning program S20 in FIG. 7.

FIG. 8 is a flowchart illustrating the detailed processes of the boot time point tuning program S20 in FIG. 7. In the flowchart of FIG. 8, arithmetic expressions and referenced tables and the like in the respective processes are illustrated. Thus, the respective processes can be understood easily when FIG. 8 is appropriately referenced in the description of the following specific example.

[Adjustment of boot time point when virtual machines VM1 and VM4 are scheduled to be booted up as in FIGS. 16 and 17 in a state in which boot processing time result data log is not sufficiently collected (or is being collected)]

FIG. 12 is a diagram illustrating an example of the automated boot control schedule. The table TBL4 is as described above.

FIG. 9 is a diagram illustrating an example of a booting process event log. According to the automated boot control schedule in FIG. 12, the virtual machines VM2, VM3, VM1, and VM4 are scheduled to be booted up at time 07:30, 07:40, 08:00, and 08:10, respectively, on the physical machine PM1. Moreover, it is assumed that a booting process event when the virtual machines VM2, VM3, VM1, and VM4 are booted up according to the schedule in FIG. 12 is also stored in the booting process event log in FIG. 9 together with the boot processing time BT. The boot time point tuning program acquires the result data of the boot processing time from the hypervisor.

FIG. 10 illustrates an example of data collected by a service quality coordinator (SQC which is a program) mounted on the physical machine PM1. This table TBL2 includes a boot time point, a physical machine ID PM_id, a vacant memory amount, and the result data of a swapped-out memory amount. The swapped-out memory amount is a memory amount secured by the memory management process of the hypervisor saving data in the memory in a swap file of a storage to secure a memory area.

FIG. 11 is a diagram illustrating an example of data of a total amount of memory mounted on a physical machine. This table TBL3 includes a total mounted memory amount corresponding to each physical machine ID. This information can be acquired from the hypervisor.

FIG. 13 is a diagram illustrating an example of a memory amount allocated (or scheduled to be allocated) to virtual machines. This table TBL5 illustrates a physical machine ID, a virtual machine ID, and an allocated memory amount. This information on the memory amount allocated to virtual machines is included in configuration data of a virtual machine and can be acquired from the hypervisor.

Thus, the boot time point tuning program predicts the deficient memory amount (the memory amount taken away from other virtual machines) that is deficient for allocating memory when a virtual machine scheduled to be booted up is booted up and the memory overcommitment ratio according to the following equations at a predetermined adjustment timing before the virtual machines VM2, VM3, VM1, and VM4 are booted up with reference to the data TBL2 collected by the SQC in FIG. 10, the total mounted memory amount TBL3 in FIG. 11, the allocated memory amount TBL5 of virtual machines in FIG. 13 (S23 in FIGS. 7 and 8).

(Deficient memory amount)=(Allocated memory
  amount)−(Vacant memory amount before booting)

(Memory overcommitment ratio)=(Total allocated
  memory amount after booting)/(Total mounted
  memory amount)

Moreover, the boot time point tuning program predicts the delay time BT2 in the boot processing time by estimation from the predicted deficient memory amount and the memory overcommitment ratio and returns the delay time BT2 to the automated boot program (S24_D in FIGS. 7 and 8).

Subsequently, whenever the virtual machines VM2, VM3, VM1, and VM4 are booted up, the boot time point tuning program calculates the deficient memory amount (the memory amount taken away from other virtual machines) of the booted-up virtual machine and the memory overcommitment ratio according to the following equations with reference to the booting process event log TBL1 in FIG. 9, the data TBL2 collected by the SQC in FIG. 10, the total mounted memory amount TBL3 in FIG. 11, and the allocated memory amount TBL5 of virtual machines in FIG. 13 and stores the deficient memory amount and the memory overcommitment ratio in the boot processing time result data log (S21 in FIGS. 7 and 8).

(Deficient memory amount)=(Allocated memory
  amount)−(Vacant memory amount before booting)

(Memory overcommitment ratio)=(Total allocated
  memory amount after booting)/(Total mounted
  memory amount)

Hereinafter, the specific example will be described.

[Booting of Virtual Machine VM2]

First, the adjustment (S22 to S25 in FIGS. 7 and 8) of the boot time point before the virtual machine VM2 is booted up will be described. The boot time point tuning program obtains the automated boot control schedule TBL4 (S22 in FIG. 8). Since the result data is not accumulated, the boot time point tuning program predicts the delay time at the scheduled boot time point of VM2 by estimation (S24_D in FIG. 7).

According to the data 000 of the data TBL2 collected by the SQC in FIG. 10, since the vacant memory amount is 32 GB and the memory amount scheduled to be allocated to the virtual machine VM2 is 12 GB, the predicted deficient memory amount when the virtual machine VM2 is booted up is 0 (S23 in.

FIGS. 7 and 8). Thus, the hypervisor does not need to perform the process of taking the deficient memory amount from other virtual machines in order to allocate memory to virtual machines during booting. As a result, the boot time point tuning program does not need to adjust the scheduled boot time point of VM2 (S24_D in FIGS. 7 and 8).

Subsequently, when the virtual machine VM2 is booted up, the boot time point tuning program acquires the booting process event log TBL1 of the boot processing time of the virtual machine VM2 from the hypervisor, calculates the deficient memory amount and the degree of memory overcommitment, and accumulates the deficient memory amount and the degree of memory overcommitment in the boot processing time result data log in association with the boot processing time BT (S21).

In the specific example, when the virtual machine VM2 is first booted up on the physical machine PM1 in FIG. 16, the total mounted memory amount of the physical machine PM1 is 32 GB (see TBL3 in FIG. 11), the vacant memory amount after booting is 20 GB, and the swapped-out memory amount is 0 (see TBL2 in FIG. 10).

Thus, the total allocated memory amount after booting is calculated as follows.

(Total actual memory amount (32 GB))−(Vacant
  memory amount after booting (20 GB))+
  (Swapped-out memory amount (0 GB))=12 GB The memory overcommitment ratio after booting is calculated as follows.

(Total allocated memory amount (12 GB))/(Total
  mounted memory amount (32 GB))=12/
  32=37.5%

Since no virtual machine is booted up before booting of VM2 in the table TBL2 in FIG. 10 and the vacant memory amount is 32 GB, the deficient memory amount during booting of VM2 is calculated as follows.

(Allocated memory amount (12 GB))−(Vacant
  memory amount before booting (32 GB))=0

FIG. 14 is a diagram illustrating an example of the boot processing time result data log. In this table TBL6, the deficient memory amount (0 GB) and the memory overcommitment ratio (12/32) when the virtual machine VM2 is booted up on the physical machine PM1 are stored in result No.=001 in association with the boot processing time BT (S21 in FIGS. 7 and 8).

The allocated memory amount allocated to the virtual machine VM2 can be acquired from a difference (32 GB−20 GB=12 GB) between the vacant memory amounts in the table TBL2.

[Booting of Virtual Machine VM3]

First since the result data is not accumulated during adjustment of the boot time point before the virtual machine VM3 is booted up, the boot time point tuning program predicts the delay time at the scheduled boot time point of the VM3 by estimation (S24_D in FIG. 7).

According to the data 001 of the data TBL2 collected by the SQC in FIG. 10, since the vacant memory amount is 20 GB and the memory amount scheduled to be allocated to the virtual machine VM3 is 16 GB, the predicted deficient memory amount when the virtual machine VM3 is booted up is 0 (S23 in FIGS. 7 and 8). That is, the hypervisor does not need to perform the process of taking the deficient memory amount from other virtual machines in order to allocate memory to virtual machines during booting. As a result, the boot time point tuning program does not need to adjust the scheduled boot time point of VM3 (S24_D in FIGS. 7 and 8).

Subsequently, when the virtual machine VM3 is booted up, the boot time point tuning program acquires the booting process event log TBL1 of the boot processing time of the virtual machine VM3 from the hypervisor, calculates the deficient memory amount and the degree of memory overcommitment, and accumulates the deficient memory amount and the degree of memory overcommitment in the boot processing time result data log in association with the boot processing time BT (S21).

Specifically, when the virtual machine VM3 is booted up on the physical machine PM1, the total allocated memory amount, the memory overcommitment ratio, and the deficient memory amount are calculated as follows.

The total allocated memory amount is calculated as follows.

(Total actual memory amount (32 GB))−(Vacant
  memory amount after booting (4 GB))+
  (Swapped-out memory amount (0 GB))=28 GB The memory overcommitment ratio is calculated as follows.

(Total allocated memory amount (28 GB))/(Total mounted memory amount (32 GB))=28/32=87.5%

The deficient memory amount is calculated as follows.

(Allocated memory amount (16 GB))−(Vacant memory amount before booting (20 GB))=0

The deficient memory amount (0 GB) and the memory overcommitment ratio (28/32) when the virtual machine VM3 is booted up on the physical machine PM1 are stored in result No.=002 in FIG. 14 in association with the boot processing time BT (S21 in FIGS. 7 and 8).

The allocated memory amount allocated to the virtual machine VM3 can be acquired from a difference (20 GB−4 GB=16 GB) between the vacant memory amounts in the table TBL2.

[Booting of Virtual Machine VM1]

First, the adjustment of the boot time point before the virtual machine VM1 is booted up will be described (S22 to S25 in FIGS. 7 and 8). Since the result data is not accumulated, the boot time point tuning program predicts the delay time at the scheduled boot time point of the VM1 by estimation (S24_D in FIGS. 7 and 8).

In a stage before the virtual machine VM1 is booted up, the boot time point tuning program calculates the predicted deficient memory amount and the degree of memory overcommitment as follows (S23 in FIGS. 7 and 8).

The deficient memory amount is calculated as follows.

(Allocated memory amount (28 GB))−(Vacant memory amount before booting (4 GB))=24 GB The total allocated memory amount is calculated as follows.

(Total actual memory amount (32 GB))−(Vacant memory amount after booting (0 GB))+(Swapped-out memory amount (24 GB))=56 GB The memory overcommitment ratio is calculated as follows.

(Total allocated memory amount (56 GB))/(Total mounted memory amount (32 GB))=56/32=175%

The boot time point tuning program predicts the delay time of the boot processing time from the estimated delay time DT in FIG. 15 based on the deficient memory amount of 24 GB (S24_D in FIGS. 7 and 8). Since the delay time DT_24 when the deficient memory amount is 24 GB is registered in the estimated delay time in FIG. 15, the delay time DT_24 is used as the predicted delay time. If the delay time DT_24 when the deficient memory amount is 24 GB is not present in the table TBL7, the delay time is predicted based on the delay time DT_16 when the deficient memory amount is 16 GB as follows.

Delay time DT_24=(DT_6/16 GB)×24 GB

Moreover, the boot time point tuning program adjusts the scheduled boot time point 8:00 of the virtual machine VM1 so as to occur earlier by the predicted delay time to calculate the adjusted scheduled boot time point and returns the adjusted scheduled boot time point to the boot control program (S25 in FIGS. 7 and 8). Based on the adjusted scheduled boot time point, the boot control program starts booting the virtual machine VM1 at the adjusted scheduled boot time point 8:00−DT_24.

As illustrated in FIG. 16, the memory areas MEM_VM2 and MEM_VM3 in the memory 12 of the physical machine PM1 are already allocated to the virtual machines VM2 and VM3, and the vacant memory amount is only 4 GB. Due to this, the hypervisor takes the deficient memory amount 24 GB away from the virtual machines VM2 and VM3 to enable the booting process of the virtual machine VM1.

Subsequently, in FIG. 16, when the virtual machine VM1 is booted up on the physical machine PM1, the boot time point tuning program acquires the deficient memory amount and the degree of memory overcommitment and stores the same in the boot processing time result data log (S21 in FIGS. 7 and 8). As described above, the deficient memory amount and the degree of memory overcommitment are calculated as follows.

The total allocated memory amount is calculated as follows.

(Total actual memory amount (32 GB))−(Vacant memory amount after booting (0 GB))+(Swapped-out memory amount (24 GB))=56 GB The memory overcommitment ratio is calculated as follows.

(Total allocated memory amount (56 GB))/(Total mounted memory amount (32 GB))=56/32=175%

The deficient memory amount is calculated as follows.

(Allocated memory amount (28 GB))−(Vacant memory amount before booting (4 GB))=24 GB The deficient memory amount (24 GB) and the memory overcommitment ratio (56/32) when the virtual machine VM1 is booted up on the physical machine PM1 are stored in result No.=003 in FIG. 14 in association with the boot processing time BT (S21 in FIGS. 7 and 8).

[Booting of Virtual Machine VM4]

First, the adjustment of the boot time point before the virtual machine VM4 is booted up will be described (S22 to S25 in FIGS. 7 and 8). Since the result data is not accumulated, the boot time point tuning program predicts the delay time at the scheduled boot time point of the VM4 by estimation (S24_D in FIGS. 7 and 8).

In a stage before the virtual machine VM4 is booted up, the boot time point tuning program calculates the predicted deficient memory amount and the degree of memory overcommitment as follows (S23 in FIGS. 7 and 8).

The deficient memory amount is calculated as follows.

(Allocated memory amount (12 GB))−(Vacant memory amount before booting (0 GB))=12 GB The total allocated memory amount after booting is calculated as follows.

(Total actual memory amount (32 GB))−(Vacant memory amount after booting (0 GB))+(Swapped-out memory amount (36 GB))=68 GB The memory overcommitment ratio after booting is calculated as follows.

(Total allocated memory amount (68 GB))/(Total mounted memory amount (32 GB))=68/32=212.5%

The boot time point tuning program predicts the delay time of the boot processing time from the estimated delay time DT in FIG. 15 based on the deficient memory amount of 24 GB (S24_D in FIGS. 7 and 8). Since the delay times DT_8 and DT_16 when the deficient memory amounts are 8 GB and 16 GB, respectively, are registered in the estimated delay time in FIG. 15, the delay time DT_12 can be calculated as follows.

Predicted delay time DT_12=(DT_8+DT_16)/2

Moreover, the boot time point tuning program adjusts the scheduled boot time point 8:10 of the virtual machine VM4 so as to occur earlier by the predicted delay time DT_12 to calculate the adjusted scheduled boot time point and returns the adjusted scheduled boot time point to the boot control program (S25). Based on the adjusted scheduled boot time point, the boot control program starts booting the virtual machine VM4 at the adjusted scheduled boot time point 8:10−DT_12.

Subsequently, in FIG. 17, when the virtual machine VM4 is booted up on the physical machine PM1, the boot time point tuning program acquires the deficient memory amount and the degree of memory overcommitment and stores the same in the boot processing time result data log (S21 in FIGS. 7 and 8). As described above, the deficient memory amount and the degree of memory overcommitment are calculated as follows.

The total allocated memory amount after booting is calculated as follows.

(Total actual memory amount (32 GB))−(Vacant memory amount after booting (0 GB))+(Swapped-out memory amount (36 GB))=68 GB The memory overcommitment ratio after booting is calculated as follows.

(Total allocated memory amount (68 GB))/(Total mounted memory amount (32 GB))=68/32=212.5%

The deficient memory amount is calculated as follows.

(Allocated memory amount (12 GB))−(Vacant memory amount before booting (0 GB))=12 GB The deficient memory amount and the memory overcommitment ratio when the virtual machine VM4 is booted up on the physical machine PM1 are stored in result No.=004 in FIG. 14 in association with the boot processing time BT (S21 in FIGS. 7 and 8).

[Adjustment of Scheduled Boot Time Point when Virtual Machines VM1 and VM4 are Scheduled to be Booted up as in FIGS. 16 and 17 in a State in which Boot Processing Time Result Data Log is Sufficiently Collected]

Next, the adjustment of the scheduled boot time point when the virtual machine VM1 is scheduled to be booted up as in FIG. 16 and when the virtual machine VM4 is scheduled to be booted up as in FIG. 17 in a state in which the booting process of the virtual machines VM1 to VM4 is performed and the boot processing time result data log in FIG. 14 is accumulated will be described.

[Booting of VM1]

The boot time point tuning program acquires the automated boot control schedule TBL4 (S22 in FIG. 8). According to the automated boot control schedule, the virtual machines VM2 and VM3 are already booted up at the scheduled boot time point of the virtual machine VM1. Thus, the boot time point tuning program calculates the predicted deficient memory amount and the predicted degree of memory overcommitment at the scheduled boot time point of the virtual machine VM1 (S23 in FIGS. 7 and 8). The predicted deficient memory amount and the predicted degree of memory overcommitment are calculated similarly to when the virtual machine VM1 is booted up as follows.

(Predicted deficient memory amount)=(Allocated memory amount (28 GB))−(Predicted vacant memory amount (4 GB))=24 GB (Predicted memory overcommitment ratio)=(Total scheduled allocated memory amount (56 GB))/(Total mounted memory amount (32 GB))=56/32=175%

Thus, the boot time point tuning program searches the boot processing time result data log TBL6 in FIG. 14 to extract the boot processing time BT003 (result No.=003) associated with a deficient memory amount having a correlation with the predicted deficient memory amount (24 GB) (S24_B in FIGS. 7 and 8). If there are a number of logs correlated with the predicted deficient memory amount (24 GB), the boot time point tuning program extracts the boot processing time in the log correlated with the degree of memory overcommitment (memory overcommitment ratio or amount). Moreover, the boot time point tuning program subtracts the average value of the boot processing time in the log indicating that the predicted deficient memory amount=0 in the result data log from the extracted boot processing time BT003 to calculate the predicted delay time DT (S25 in FIGS. 7 and 8).

Since the result data when the virtual machine VM1 is booted up is already accumulated in the result data log TBL6 at the scheduled boot time point of the virtual machine VM1, the boot time point tuning program acquires the predicted delay time with reference to the boot processing time in the result data.

After that, when the virtual machine VM1 is booted up, the boot time point tuning program acquires the deficient memory amount and the degree of memory overcommitment and stores the same in the result data log.

[Booting of VM4]

Subsequently, according to the automated boot control schedule TBL4, the virtual machines VM2, VM3, and VM1 are already booted up at the scheduled boot time point of the virtual machine VM4. Thus, the boot time point tuning program calculates the predicted deficient memory amount and the predicted degree of memory overcommitment at the scheduled boot time point of the virtual machine VM4 as follows (S23 in FIG. 8).

(Predicted deficient memory amount)=(Allocated memory amount (12 GB))−(Predicted vacant memory amount (0 GB))=12 GB (Predicted memory overcommitment ratio)=(Total scheduled allocated memory amount (68 GB))/(Total mounted memory amount (32 GB))=68/32=212.5%

Thus, the boot time point tuning program searches the boot processing time result data log in FIG. 14 to extract the boot processing time BT004 (result No.=004) correlated with a deficient memory amount having a correlation with the predicted deficient memory amount (12 GB) (S24_B in FIGS. 7 and 8). If there are a number of logs correlated with the predicted deficient memory amount, the boot time point tuning program extracts the boot processing time in the log correlated with the degree of memory overcommitment (memory overcommitment ratio or amount). Moreover, the boot time point tuning program subtracts the average value of the boot processing time in the log indicating that the predicted deficient memory amount=0 in the result data log from the extracted boot processing time BT004 to calculate the predicted delay time DT (S24 and S25 in FIG. 8).

Since the result data when the virtual machine VM4 is booted up is already accumulated in the result data log TBL6 at the scheduled boot time point of the virtual machine VM4, the boot time point tuning program acquires the predicted delay time with reference to the boot processing time in the result data.

After that, when the virtual machine VM4 is booted up, the boot time point tuning program acquires the deficient memory amount and the degree of memory overcommitment and stores the same in the result data log.

[Modified Example of First and Second Boot Control]

When the adjusted boot time points of a plurality of virtual machines occur on a short period in a concentrated manner, it is preferable to readjust the adjusted boot time points so that the respective adjusted boot time points do not overlap in the boot processing time. This is because, when the booting processes of a plurality of virtual machines overlap with each other, it cannot be said that the same delay time of the boot processing time as the result data log is always obtained.

Alternatively, a plurality of virtual machines of which the boot time points occur in a predetermined short period in a concentrated manner may be grouped collectively as a group of virtual machines and the recording of the result data log and the adjustment of the boot time point may be performed collectively. For example, in the above example, the boot time points of the virtual machines VM1 and VM4 occur in a short interval of time between 8:00 and 8:00. In this case, the virtual machines are regarded as a virtual machine group VM1+VM4, the sum of deficient memory amounts and the degree of memory overcommitment are recorded in the result data log in association with the boot processing times of both virtual machines, and the boot time points of both virtual machines are adjusted with reference to the result data log at the adjustment timing of the boot time points.

[Advantages of Using Boot Processing Time Result Data]

In the second boot control of the embodiment, the boot processing time result data is accumulated and the scheduled boot time point is adjusted with reference to the delay time of the boot processing time from the result data. The advantages of using the result data will be described below.

The delay time BT2 of the boot processing time tends to increase as the deficient memory amount (the memory amount taken away from other VMs) during booting. This is because, the larger the deficient memory amount, the longer the processing time needed for the hypervisor taking the memory amount away from other VMs. However, since the hypervisor becomes busy with memory control as the memory overcommitment ratio or amount increases, the delay time BT2 tends to increase. Further, in the process of the hypervisor securing the deficient memory amount by swap-out, the processing time varies depending on the access frequency to an external storage. This is because, if there are a number of accesses from booted-up virtual machines, it takes a considerable amount of time in the swap-out process for a virtual machine to be newly booted up. Moreover, depending on whether the service system is busy due to booted-up virtual machines, the processing amount of the CPU and the delay time may vary.

Thus, although the delay time is estimated in advance depending on the deficient memory amount as in FIG. 15 by experiments, the delay time BT2 of the boot processing time varies due to various factors such as a physical machine operating actually, an external storage, an IO control device, an service system, and the like. Due to such reasons, it is preferable to accumulate result data and predict the delay time BT2 from the boot processing time in the accumulated items of result data of which the conditions during booting are correlated.

However, when the scheduled boot time point is adjusted, the boot time point tuning program may estimate the predicted delay time according to the deficient memory amount by calculation and adjust the scheduled boot time point so as to occur earlier by the predicted delay time. By doing so, it is possible to obtain a certain advantage that the completion time point of the booting process approaches the scheduled boot time point.

As described above, according to the present embodiment, it is possible to increase the accuracy of the schedule of the automated boot control process of virtual machines and to complete the booting process of virtual machines as scheduled.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein a boot control program that causes a computer to execute a process comprising:

calculating a first memory amount, when a virtual machine is booted up on an information processing device that generates the virtual machine, based on a sum of a memory amount allocated to the virtual machine that has been booted up on the information processing device and the memory amount allocated to the virtual machine to be booted up on the information processing device;

storing, in a storage, booting process result data in which the first memory amount and a boot processing time for booting the virtual machine to be booted up are associated with each other; and determining a timing at which a booting process of a new virtual machine starts, when the new virtual machine is booted up at a predetermined boot timing, based on the boot processing time associated with the first memory amount having a correlation with a second memory amount based on a sum of a memory amount allocated to the virtual machine that has been booted up on the information processing device and a memory amount allocated to the virtual machine to be newly booted up on the information processing device, wherein the determining is performed after a boot control schedule that defines the boot timing is changed, and the determining is performed after the information processing device performs a virtual machine booting process and a virtual machine shutdown process.

2. The non-transitory computer-readable storage medium storing therein a boot control program according to claim 1, wherein the first memory amount is a memory amount acquired from other booted-up virtual machine in order to boot the virtual machine to be booted up, and the second memory amount is a memory amount acquired from other booted-up virtual machine in order to boot the new virtual machine.

3. The non-transitory computer-readable storage medium storing therein a boot control program according to claim 2, wherein
in a case where the memory amount acquired from the other booted-up virtual machine is zero when the new virtual machine is booted up, the timing at which the booting process of the new virtual machine starts is not changed from the predetermined boot timing.

4. The non-transitory computer-readable storage medium storing therein a boot control program according to claim 1, wherein
the storing includes storing, in the storage, in addition to the first memory amount, a first degree of memory overcommitment after booting of the virtual machine to be booted up, in association with the boot processing time, and
the determining includes determining the timing at which the booting process of the new virtual machine starts based on the boot processing time associated with the first degree of memory overcommitment having a correlation with a second degree of memory overcommitment after booting of the new virtual machine, among the boot processing times associated with the first memory amount having a correlation with the second memory amount.

5. The non-transitory computer-readable storage medium storing therein a boot control program according to claim 4, wherein
the first degree of memory overcommitment is a ratio of a total memory amount allocated to a plurality of virtual machines to a total memory amount mounted on the information processing device,
the second degree of memory overcommitment is a ratio of a total memory amount allocated to a plurality of virtual machines to a total memory amount mounted on the information processing device.

6. The non-transitory computer-readable storage medium storing therein a boot control program according to claim 4, wherein
the first degree of memory overcommitment is memory amounts obtained by subtracting a total memory amount mounted on the information processing device from a total memory amount allocated to a plurality of virtual machines,
the second degree of memory overcommitment is memory amounts obtained by subtracting a total memory amount mounted on the information processing device from a total memory amount allocated to a plurality of virtual machines.

7. The non-transitory computer-readable storage medium storing therein a boot control program according to claim 1, wherein
the determining includes:
determining, when the first memory amount having a correlation with the second memory amount is not present in the booting process result data, an estimated delay time of the booting process of the new virtual machine according to a ratio of the second memory amount to a third memory amount acquired from the other virtual machine when the new virtual machine is booted up, from an estimated delay time corresponding to the third memory amount, and
determining the timing at which the booting process of the new virtual machine starts based on the determined estimated delay time.

8. The non-transitory computer-readable storage medium storing therein a boot control program according to claim 1, wherein
the determining includes determining, when the first memory amount having a correlation with the second memory amount is present in the booting process result data, the timing at which the booting process starts at a time point occurring earlier than the boot timing by a delay time corresponding to the first memory amount having a correlation with the second memory amount in the booting process result data.

9. The non-transitory computer-readable storage medium storing therein a boot control program according to claim 1, wherein
the first memory amount is a memory amount that is insufficient in order to boot the virtual machine to be booted up, and
the second memory amount is a memory amount that is insufficient in order to boot the new virtual machine.

10. A boot control method comprising:
calculating, by a processor, a first memory amount, when a virtual machine is booted up on an information processing device that generates the virtual machine, based on a sum of a memory amount allocated to the virtual machine that has been booted up on the information processing device and the memory amount allocated to the virtual machine to be booted up on the information processing device;
storing, by a processor, in a storage, booting process result data in which the first memory amount and a boot processing time for booting the virtual machine to be booted up are associated with each other; and
determining, by a processor, a timing at which a booting process of a new virtual machine starts, when the new virtual machine is booted up at a predetermined boot timing, based on the boot processing time associated with the first memory amount having a correlation with a second memory amount based on a sum of a memory amount allocated to the virtual machine that has been booted up on the information processing device and a memory amount allocated to the virtual machine to be newly booted up on the information processing device, wherein
the determining is performed after a boot control schedule that defines the boot timing is changed, and
the determining is performed after the information processing device performs a virtual machine booting process and a virtual machine shutdown process.

11. A boot control device comprising:
a processor configured to calculate a first memory amount, when a virtual machine is booted up on an information processing device that generates the virtual machine, based on a sum of a memory amount allocated to the virtual machine that has been booted up on the information processing device and the memory amount allocated to the virtual machine to be booted up on the information processing device;
a memory to store booting process result data in which the first memory amount and a boot processing time for booting the virtual machine to be booted up are associated with each other; and
the processor configured to determine a timing at which a booting process of a new virtual machine starts, when the new virtual machine is booted up at a predetermined boot timing, based on the boot processing time associated with the first memory amount having a correlation with a second memory amount based on a sum of a memory amount allocated to the virtual machine that has been booted up on the information processing device and a memory amount allocated to the virtual machine to be newly booted up on the information processing device, wherein the processor determines the timing at which the booting process of the new virtual machine starts after a boot control schedule that defines the boot timing is changed, and the processor determines the timing at which the booting process of the new virtual machine starts after the information processing device performs a virtual machine booting process and a virtual machine shutdown process.

12. A non-transitory computer-readable storage medium storing therein a boot control program that causes a computer to execute a process comprising:

calculating a first memory amount, when a virtual machine is booted up on an information processing device that generates the virtual machine, acquired from another booted-up virtual machine in order to boot the virtual machine to be booted up;

storing, in a storage, booting process result data in which the first memory amount and a boot processing time for booting the virtual machine to be booted up are associated with each other; and determining a timing at which a booting process of a new virtual machine starts, when the new virtual machine is booted up at a predetermined boot timing, based on the boot processing time associated with the first memory amount having a correlation with a second memory amount acquired from other booted-up virtual machine in order to boot the new virtual machine, wherein the determining is performed after a boot control schedule that defines the boot timing is changed, and the determining is performed after the information processing device performs a virtual machine booting process and a virtual machine shutdown process.

13. A boot control method comprising:

calculating, by a processor, a first memory amount, when a virtual machine is booted up on an information processing device that generates the virtual machine, acquired from other booted-up virtual machine in order to boot the virtual machine to be booted up;

storing, by the processor, in a storage, booting process result data in which the first memory amount and a boot processing time needed for booting the virtual machine to be booted up are associated with each other; and determining, by the processor, a timing at which a booting process of a new virtual machine starts, when the new virtual machine is booted up at a predetermined boot timing, based on the boot processing time associated with the first memory amount having a correlation with a second memory amount acquired from the another booted-up virtual machine in order to boot the new virtual machine, wherein the determining is performed after a boot control schedule that defines the boot timing is changed, and the determining is performed after the information processing device performs a virtual machine booting process and a virtual machine shutdown process.

14. A boot control device comprising:

a processor configured to calculate a first memory amount, when a virtual machine is booted up on an information processing device that generates the virtual machine, acquired from another booted-up virtual machine in order to boot the virtual machine to be booted up;

a memory to store booting process result data in which the first memory amount and a boot processing time needed for booting the virtual machine to be booted up are associated with each other; and the processor configured to determine a timing at which a booting process of a new virtual machine starts, when the new virtual machine is booted up at a predetermined boot timing, based on the boot processing time associated with the first memory amount having a correlation with a second memory amount acquired from the another booted-up virtual machine in order to boot the new virtual machine, wherein the processor determines the timing at which the booting process of the new virtual machine starts after a boot control schedule that defines the boot timing is changed, and the processor determines the timing at which the booting process of the new virtual machine starts after the information processing device performs a virtual machine booting process and a virtual machine shutdown process.

* * * * *